United States Patent
Hilpert

(10) Patent No.: US 9,861,991 B2
(45) Date of Patent: Jan. 9, 2018

(54) CONTROL SYSTEM FOR A DECANTER CENTRIFUGE

(71) Applicant: Engip LLC, Houston, TX (US)

(72) Inventor: Jeffrey L. Hilpert, Conroe, TX (US)

(73) Assignee: Engip, LLC, Houston, TX (US)

(*) Notice: Subject to any disclaimer, the term of this patent is extended or adjusted under 35 U.S.C. 154(b) by 106 days.

(21) Appl. No.: 15/209,581

(22) Filed: Jul. 13, 2016

(65) Prior Publication Data

US 2016/0318042 A1    Nov. 3, 2016

Related U.S. Application Data

(63) Continuation of application No. 14/262,872, filed on Apr. 28, 2014.

(51) Int. Cl.
| | |
|---|---|
| *B04B 9/10* | (2006.01) |
| *B04B 11/04* | (2006.01) |
| *B04B 1/20* | (2006.01) |
| *G01L 3/14* | (2006.01) |

(52) U.S. Cl.
CPC ............ *B04B 9/10* (2013.01); *B04B 1/20* (2013.01); *B04B 1/2016* (2013.01); *B04B 11/04* (2013.01); *G01L 3/1478* (2013.01); *B04B 2001/2025* (2013.01)

(58) Field of Classification Search
CPC ... B04B 11/04; B04B 2001/2025; B04B 1/20; G01L 3/1478
USPC .............................................. 494/10; 702/41
See application file for complete search history.

(56) References Cited

U.S. PATENT DOCUMENTS

| | | | | |
|---|---|---|---|---|
| 2,844,677 A | * | 7/1958 | Hanssen | H01H 35/06 200/329 |
| 5,948,271 A | * | 9/1999 | Wardwell | B04B 1/20 210/143 |
| 6,143,183 A | | 11/2000 | Wardwell et al. | |
| 7,028,226 B2 | | 4/2006 | Fleuter | |
| 2004/0138040 A1 | | 7/2004 | Hensley et al. | |
| 2009/0105059 A1 | * | 4/2009 | Dorry | B04B 1/2016 494/37 |

(Continued)

FOREIGN PATENT DOCUMENTS

| | | | | |
|---|---|---|---|---|
| WO | | 2720634 | 6/1997 | |
| WO | WO 2014175025 A1 | * | 10/2014 | ............. B04B 11/02 |

OTHER PUBLICATIONS

UDPTO Office Action for U.S. Appl. No. 14/262,872 dated Aug. 8, 2016.

(Continued)

*Primary Examiner* — Charles Cooley
*Assistant Examiner* — Shirley S Liu
(74) *Attorney, Agent, or Firm* — Tumey L.L.P.

(57) ABSTRACT

A torque sensing device capable of measuring the force exerted by a torque arm on a lever is positioned between the torque arm and the lever. The torque arm is connected to the pinion of a planetary gearbox for rotating the bowl and screw conveyer of a decanter centrifuge at different speeds. The torque sensing device measures the torque between the pinion gear and the planetary gearbox. The sensor can be connected to a controller which can reduce the flow of the liquid/solid mixture to the decanter centrifuge thereby/reducing the torque and avoiding substantial damage to the planetary gearbox.

8 Claims, 2 Drawing Sheets

(56) References Cited

U.S. PATENT DOCUMENTS

2015/0226618 A1  8/2015 Shih
2015/0375141 A1* 12/2015 Kinoshita ............... B04B 11/02
                                                         44/608

OTHER PUBLICATIONS

FelxiForce (R) Sensors Overview, Tekscan, Web Mar. 25, 2014.
USPTO Office Action for U.S. Appl. No. 14/262,872 dated Jan. 3, 2017.

* cited by examiner

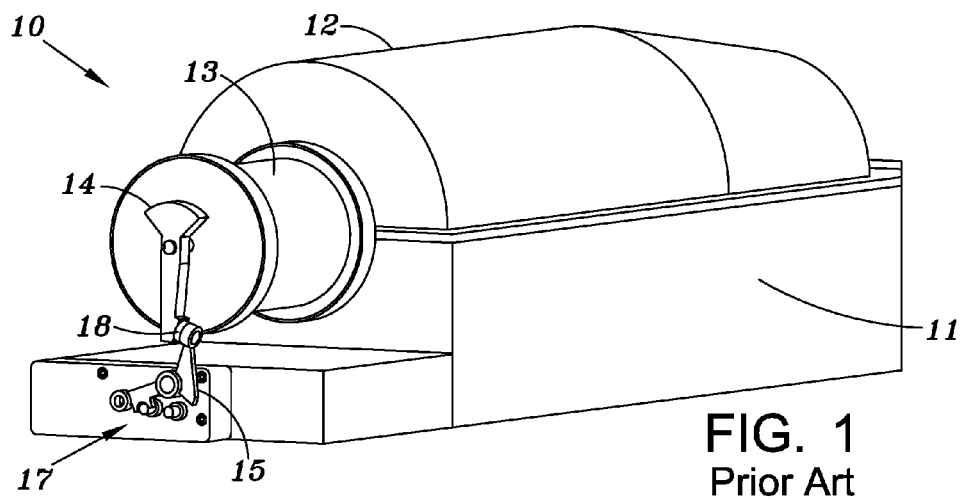
FIG. 1
Prior Art
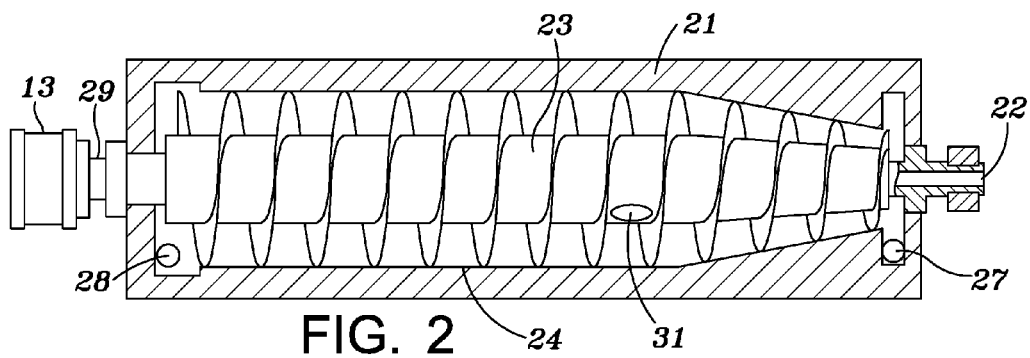
FIG. 2
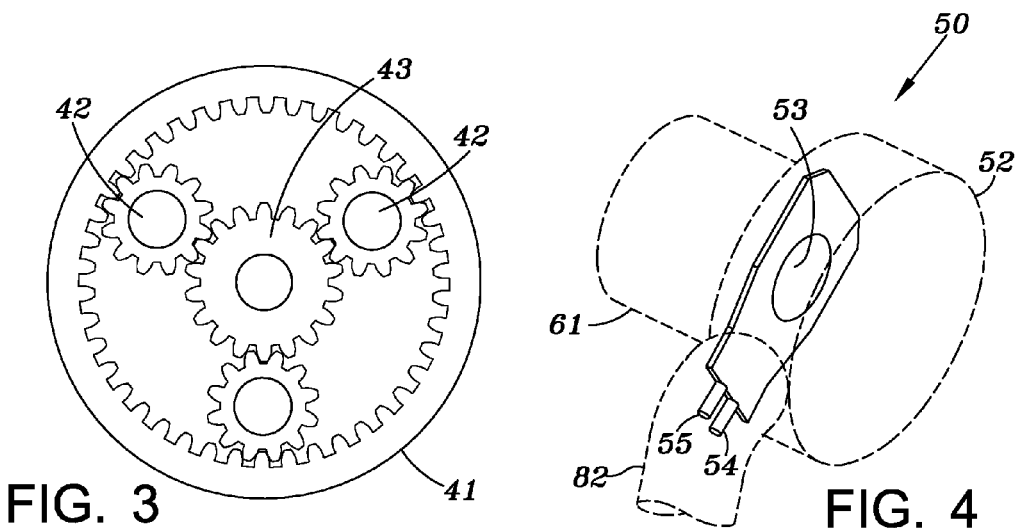
FIG. 3
FIG. 4

CONTROL SYSTEM FOR A DECANTER CENTRIFUGE

CROSS-REFERENCE TO RELATED APPLICATIONS

This application is a continuation of U.S. application Ser. No. 14/262,872 filed on Apr. 28, 2014, which is herein incorporated by reference in its entirety.

BACKGROUND OF INVENTION

1. Field of the Invention

The invention disclosed and claimed in this application is directed to a torque sensing and control system for a decanter centrifuge. A torque sensor may be incorporated into a known torque control mechanism that will measure the torque acting on a pinion gear of a planetary gearbox used to rotate the centrifuge conveyor and bowl. This data may be used to control various parameters such as the feed rate of the liquid to the separator and vary the speeds of the drive motor for the centrifuge.

2. Description of Related Art

Decanter centrifuges are used in a wide variety of industries to remove fine solids from liquids. In operation, the bowl spins at a high rate of speed creating centripetal force, commonly referred to as G Force, causing the heavier solids to settle to the wall of the bowl. The solids that settle to the wall are conveyed to the solids discharge end of the decanter by the screw conveyor. The screw conveyor is driven by a planetary gearbox in the same direction as the bowl but at a slightly different speed causing a relative differential speed between the bowl and screw conveyor. The planetary gearbox casing or ring gear is connected to the bowl. The planet assembly of the planetary gearbox is connected to the screw conveyor. The pinion shaft of the planetary gearbox is held fixed relative to the base of the centrifuge via the torque arm. The differential speed between the bowl and the screw conveyor is set by the ratio of the planetary gearbox. Common ratios are 50:1 to 175:1. A very common ratio is 53:1 and is widely used by several major manufactures. Common bowl speeds are 1500 rpm to 4000 rpm. A very common speed is 3000 rpm. The resultant screw conveyor differential rpm of a decanter centrifuge operating at 3000 rpm with a 53; 1 planetary gearbox is 3000/53=56.6. The amount of solids that can be conveyed is directly related to the maximum torque of the planetary gearbox. It is common to protect the planetary gearbox from damage due to overloading via a torque control devise connected to the pinion of the planetary gearbox. A very common device is a simple spring loaded over center mechanism which trips at a predetermined load and allows the pinion to rotate at bowl speed, reducing the differential speed to zero and eliminating the load on the planetary gearbox.

In operation the centrifuge is fed the liquid and solids mixture via the centrifuge feed pump. The typical arrangement allows for interconnection of the feed pump motor control with the centrifuge motor control. This arrangement will not allow the feed pump to operate unless the centrifuge is operating normally. This configuration does not have any indication or feedback of the operating load or torque load of the planetary gearbox. Operators rely on experience and manufactures guidelines to determine optimal feed rates. This method of operation is very problematic and inefficient. This is especially true when centrifuging drilling fluid associated with upstream oil and gas exploration. In this application the drilling fluid rheology is constantly changing and so too is the maximum process rate of the centrifuge. Typically the operator will most likely set the feed rate at a much lower than optimal rate "safe rate" to ensure the centrifuge does not trip on overload. If the centrifuge does trip on overload it will be "plugged" and will require a great deal of effort to "unplug." There will be down time associated with this event and loss of revenue.

There are devices that are available which will sense the load on the planetary gearbox and shut the feed pump off if an overload is imminent. These devices are intended to protect the centrifuge from "plugging" by shutting off the feed pump, but do not control or adjust the feed rate to allow the centrifuge to continue processing. Additionally, these systems utilize expensive load cells and the centrifuge over torque device must be modified to accept the load cell.

Thus there remains a need for a simple inexpensive device, which can be easily retrofit without modification to a standard fixed drive centrifuge, that will provide for automatic control of the centrifuge feed rate to ensure optimal process rate.

BRIEF SUMMARY OF THE INVENTION

The instant invention is based on thin film piezoresistive material preconfigured for sensor wire attachment. This preconfigured piezoresistive cell is precisely overmolded, utilizing a durometer polyurethane elastomer for example, into a configuration that is very similar to the typical torque rest level pad. This configuration allows the load sensor to easily be retrofitted into the torque rest level. The sensor provides a directly proportional voltage indication of the planetary gearbox load which can be utilized to control the feed pump or a diverter valve. The sensor will include controller circuitry which allows the operator to set a desired maximum load as well as a dead band of normal operation. If the centrifuge load exceeds the maximum load set point, the controller will begin to reduce the feed rate until the load falls within the dead band. If the load again increases to exceed the maximum load set point, the controller will reduce the feed rate further until the load falls within the dead band. If the load decreases to a level below the dead band the controller will increase the feed rate until the load falls within the dead band.

BRIEF DESCRIPTION OF THE SEVERAL VIEWS OF THE DRAWING(S)

FIG. 1 is a perspective view of a conventional decanter centrifuge with a torque sensor.

FIG. 2 is a side elevation view of the bowl and a screw conveyor positioned within the housing shown in FIG. 1.

FIG. 3 is a schematic view of a planetary gear box.

FIG. 4 is a perspective view of a torque sensor according to an embodiment of the invention.

DETAILED DESCRIPTION OF THE INVENTION

Figure 5:
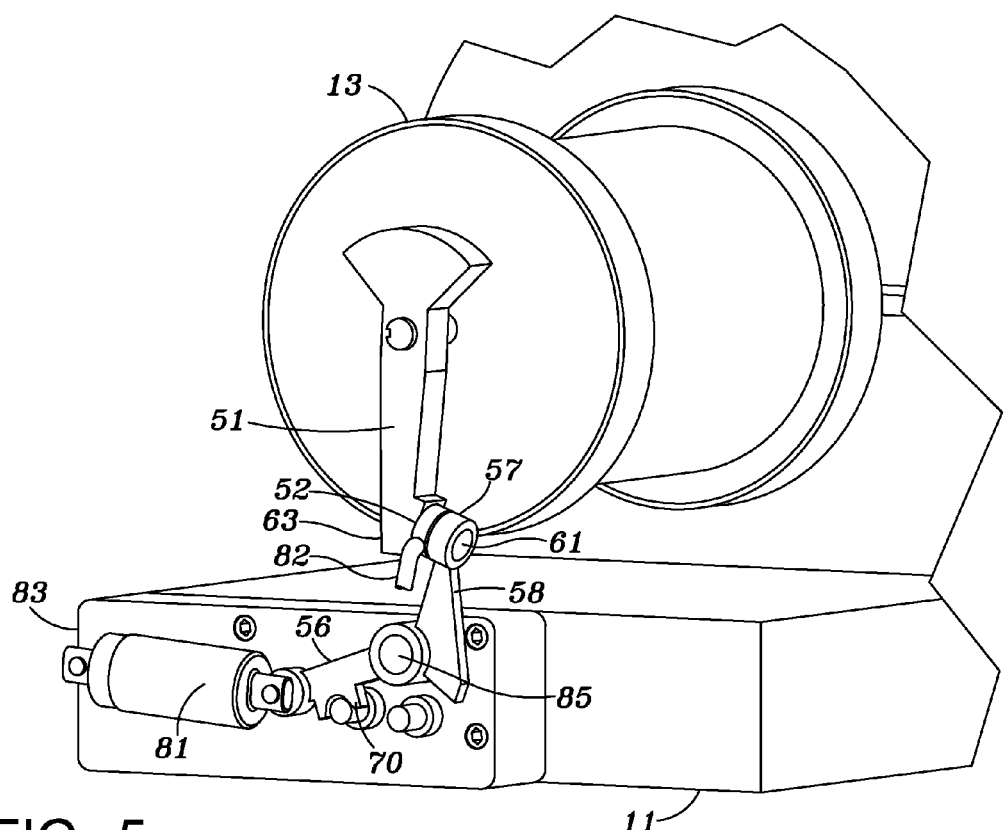
FIG. 5 is a perspective view of a torque sensor according to an embodiment of the invention connected to the centrifuge torque sensing mechanism.

As shown in FIG. 1, a typical prior art decanter centrifuge 10 includes a base support 11 and cover 12 pivoted to the base support. A planetary gearbox housing 13 houses a planetary gear system for example as shown in FIG. 3. A torque sensing assembly 17 is connected to the base and includes a spring loaded over center assembly 81 as discussed below and a lever arm 15 pivotally connected to the over center assembly 81 and pivoted about a support pin 55 shown in FIG. 5.

Lever arm 15 includes a rest pad 18 which is adapted to be engaged by a torque sensor arm 14 which is attached to the fixed center pinion of the planetary gear system. As discussed above, when the torque on the fixed center pinion of the drive planetary gearing exceeds a predetermined maximum, the distal portion of the torque sensor arm 14 will exert a force on lever arm 15 sufficient to cause the over center mechanism to trip. At this point lever arm 15 will rotate downwardly as seen in FIG. 5 which allows the torque sensor arm 14 and pinion gear to rotate freely with the ring gear, thus reducing the differential speed to zero and thus eliminating the load on the planetary gearbox.

FIG. 2 illustrates the internal parts and function of a typical decanter centrifuge. The liquid solid mixture is fed through inlet 22 of a rotating screw conveyor 23 while supported by suitable bearings. A rotating bowl 21 is also rotatably supported by suitable bearings. Gearbox 13 drives screw conveyor 23 and bowl 21 of the centrifuge as discussed above. An inlet distributor 31 allows the liquid to be treated to enter the space between screw conveyor 26 and bowl 21. Solids are directed toward the inner surface 24 of bowl 21 and are moved toward solids outlet 27 while the liquid exits the centrifuge via outlet 28.

FIG. 3 shows a typical planetary gear system including ring gear 41, planet gears 42 and a sun or pinion gear 43.

FIG. 4 illustrates a torque sensor 50 according to an embodiment of the invention. The sensor includes a first cylindrical stem portion 61 and a cylindrical head portion 52 having a diameter larger than that of stem portion 61. Embedded within head portion 52 is a flexsensor 53. A suitable flexsensor is available from Teksan, Inc. and is known as a Flexiforce® sensor which is a thin printed circuit that senses contact force. Sensor 50 includes a pair of electrical leads 54 and 55 which are connectable to a wire pigtail 82. Torque sensor 50 can be formed by encasing the flexsensor in a housing of a polyurethane elastomer, for example, by molding.

FIG. 5 illustrates the manner in which the torque sensor 50 can be connected to a conventional torque sensor assembly used for decanter centrifuges.

The torque sensor assembly includes a torque sensor arm 51 which is fixedly attached to the pinion gear of the planetary gearbox. Lever arm 56 has one end pivotally attached to over center mechanism 54 and a central portion 70 that is pivotally supported by a pin 85. Pin 85 is attached to a support block 83 which is secured to base 11. The other end 58 lever arm 56 includes a circular ring member 57 which is adapted to receive stem portion 61 of the torque sensor 50. With torque sensor 50 positioned at the end portion 57 of lever arm 56, the lower portion 63 of torque arm 51 will press against head portion 52 of the torque sensor. As the torque on the pinion gear increases, the force on the torque sensor will increase and can be monitored by a suitable monitor connected to the force sensor via wire pigtail 51.

By suitable observation and experimentation, it is possible to determine the safe operating ranges of torque on the pinion gear. As the torque approaches this range, rather than having the torque arm trip, which will cause the centrifuge to plug and require downtime to unplug the centrifuge, an operator can adjust the flow rate of the liquid/solids mixture delivered to the centrifuge. This could be done manually by adjusting valves or the speed of the liquid/solid supply pump.

Alternatively, the signal from the torque sensor could be used to automatically control the flow rate to the centrifuge by automatically adjusting a valve in a bypass loop or the speed of the supply pump.

Figure 6:
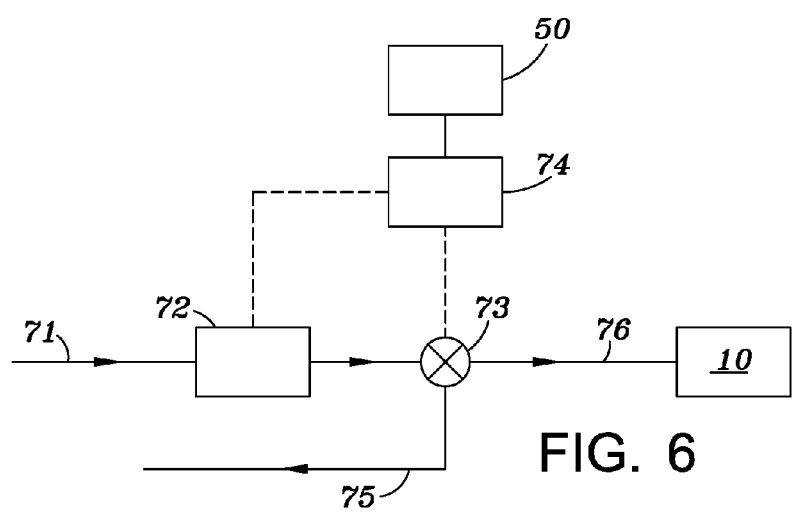
FIG. 6 is a diagram of a flow control system for the liquid to be treated.

FIG. 6 illustrates such a system in which an inlet line 71 is connected to a variable speed pump 72 which is connected to a valve 73 having an outlet line 74 and a return line 75.

Outlet conduit 74 is connected to decanter centrifuge 10. The amount of liquid delivered to centrifuge 10 can be varied by a signal from sensor 50 to a controller 74 that varies either the speed of the pump 72 or controls the amount of liquid recirculated through valve 73 via conduit 75 as is known in the art. If the torque falls below the safe operating range, the controller can increase the flow rate by increasing the speed of the pump or reducing the amount of liquid recirculated via the valve.

The torque sensor 50 can be designed to replace an existing torque pad on a machine already in the field or it can be installed in a new machine prior to use.

Also the method of controlling the flow rate does not require the use of a lever arm that is connected at one end to a center trip mechanism. The torque sensor could be placed between the torque arm connected to the pinion and a resistance member without the trip mechanism so that the force applied to the resistance member is measured and used to vary the flow rate of the liquid to the decanter centrifuge. The resistance member could be fixed to base 11.

Although the present invention has been described with respect to specific details, it is not intended that such details should be regarded as limitations on the scope of the invention, except to the extent that they are included in the accompanying claims.

What is claimed is:

1. A method of controlling the liquid/solid mixture flow rate to a decanter centrifuge, the decanter centrifuge including a planetary gearbox having a central pinion gear, a torque arm fixed to the pinion gear, and a pivoted lever arm connected at one end to an over center spring mechanism and engaging the torque arm at a second portion comprising:
    positioning a torque sensor between the torque arms fixed to the pinion gear and the second portion of the lever arm;
    measuring the torque force applied to the lever arm; and
    varying the flow rate of the liquid solid mixture to the decanter centrifuge in response to the force applied to the lever arm.

2. The method of claim 1 including varying the flow rate of the liquid/solid mixture by varying the speed of a variable speed pump which pumps the liquid/solid mixture to the decanter centrifuge.

3. The method of claim 1 including varying the flow rate of the liquid/solid mixture by controlling an adjustable valve.

4. The method of claim 1 including the terminating the flow of the liquid/solid mixture to the decanter centrifuge, at a predetermined maximum torque load.

5. The method of claim 1 including the step of establishing a range of acceptable torque force levels applied to the lever arm and varying the flow rate of the solid/liquid mixture so that the torque force level is maintained within the predetermined range.

6. The method of claim 1 further comprising the step of providing a remote monitor including a display device for displaying the measured torque force and varying the flow rate of the liquid/solid mixture in response to force measurements displayed on the monitor.

7. The method of claim 1 wherein the pivoted lever arm includes a circular ring member and the torque sensor includes a reduced diameter stem portion which is positioned within the circular ring member.

8. The method of claim 7 wherein the torque sensor also includes an enlarged portion which presses against an end portion of the torque arm.

* * * * *